Jan. 9, 1968 KOZO UCHIDA 3,362,052

CLIP

Filed June 9, 1966

United States Patent Office 3,362,052
Patented Jan. 9, 1968

3,362,052
CLIP
Kozo Uchida, 1 Ueshiomachi, 2-chome,
Minami-ku, Osaka, Japan
Filed June 9, 1966, Ser. No. 556,443
1 Claim. (Cl. 24—253)

ABSTRACT OF THE DISCLOSURE

A spring clip capable of easy manufacture in which the two components or jaw members are pivotally interconnected by the rotatable engagement of punched or struck-out catches formed on a pair of ears in one component in apertures provided in a pair of ears on the other component with such catches also serving for holding a spring in position therebetween.

The present invention relates to clips, and more specifically to clips having two clip components, such as a hair clip for curling hair, a clip for drying clothes, a paper clip, and others used generally for such purposes.

The present invention has for an object to provide a clip which is extremely simple and easy to manufacture and hence very suitable for mass production. In the known type of clips, a pair of opposed clip members is pivotally connected by means of a pin, and for this reason, the manufacture of conventional clips was very inefficient. In accordance with the present invention, the construction of the joint or connection between the two clip components is greatly simplified in that the use of a pin as a means of joining the two members has been eliminated without increasing the likelihood of the components developing erratic clipping action or the joint parts being easily damaged.

The nature and further advantages of the present invention will be appreciated more fully from the following description made with reference to the accompanying drawings forming a part of this application, and in which drawings.

Figure 1:
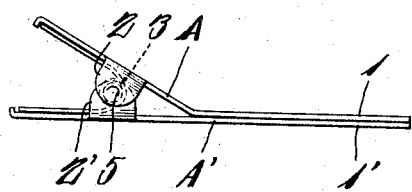
FIGURE 1 is a side elevation of a clip embodying my invention.
Figure 2:
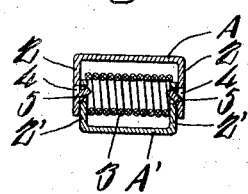
FIGURE 2 is a view in vertical section of the joint of two clip components.
Figure 3:
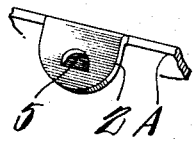
FIGURE 3 is an enlarged perspective view of a fragment of one of the clip components, showing a lobe-shaped connecting means carried thereon.
Figure 4:
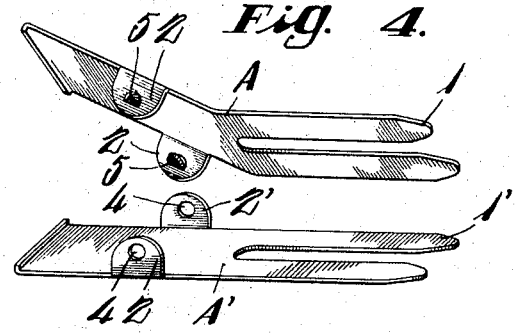
FIGURE 4 is an exploded perspective view of the two clip components in dissassembled relationship.

Referring to the drawings, A and A' designate respectively clip components having tip portions 1, 1' formed into a suitable shape for clipping purposes. Each of said clip components A and A' carries at its approximate base portion a pair of opposed lobe-shaped connecting means or ears 2, 2 and 2', 2' extending perpendicularly from said clip components and arranged to overlap each other as clearly illustrated in FIGURE 2. In the known type of clips, the overlapped ears 2, 2 and 2', 2' are pivotally connected with each other by means of a pin entering the ears at the respective central parts so as to permit the clip components A, A' to rotate freely as one unit on the pivot pin. At the same time, a rearwardly-acting spring means 3 is mounted on the pivot pin to hold flexibly the base portions of the components A, A' in an open position. To hold the base portions of the components A, A' in an open position means that the tip portions thereof are maintained flexibly in a closed position.

According to the present invention which provides an improved structure for rotatably joining or connecting the two pairs of lobe-shaped means or ears 2, 2 and 2', 2' carried by the two clip components A, A' respectively, one pair of said lobe means, for example, the ears 2', 2' are each provided with a hole 4, 4, while the other pair 2, 2 are each provided with a raised catch means 5, 5 at positions opposite the respective holes 4, 4, with the catch means being formed by simply raising part of the surface of the lobe means from the plane of the surface by some suitable means.

By virtue of such construction, when the lobe means 2, 2 are placed over the oppositely-disposed lobe means 2', 2', the catch means 5, 5 carried by the ears 2, 2 engage in the holes 4, 4 of the other ears so as to join the two pairs of ears and hence pivotally connect the two clip components together.

Although the provision of a rearwardly-acting spring means 3 at the pivot point of the ears and clip components is the same as in the known practice, the present invention offers an advantage in that when the outer ears, for example, 2, 2 in this embodiment, are provided with inwardly-projecting catch means 5, 5, the catch means enter the holes 4, 4 of the opposed inner ears 2', 2' when arranged in overlapping relationship, with the result that the tips of the catch means project inwardly from the holes, providing a suitable means for hooking and securing a coil spring means. Therefore, the structure of the present invention facilitates the fitting of the spring means onto the joint defining elements.

In a clip constructed in accordance with my invention, two clip components A, A' are pivotally joined through the lobe-shaped connecting means or ears 2, 2 and 2', 2' in such a manner that the holes 4, 4 only need to be provided in the ears of one of the clip components, and the ears of the other component with raised catch means formed by simply raising part of the surface of the ears by some suitable means. Consequently, the manufacturing process is extremely easy and simple, making it particularly well adapted for mass production.

Under the improved structure of the joining means, the engagement of the catch means 5, 5 into the holes 4, 4 can be achieved easily by overlapping or embracing the same, without the slightest danger of the joined parts later separating from each other. Moreover, the opening and closing action of the two clip components A, A' is expected by the pivotal movement of the joint part as smoothly and trouble-free as is the case of the conventional type using a pin as a means of connection.

Having thus described the nature of the present invention, what I claim herein is:

1. A clip including a first substantially straight component having a base portion and a tip portion, a pair of diametrically opposed ears extending perpendicularly from the plane of the base portion, a second component having a base portion and a tip portion, the tip portion of the second component overlying and being in facial engagement with the tip portion of the first component, with said tip portions coacting to provide a clipping means, the base portion of the second component extending at an angle away from the base portion of the first component for defining therewith a finger-gripping means, a pair of diametrically opposed ears extending perpendicularly from the plane of the base portion of the second component, the pairs of ears of said components being arranged in overlapping relationship, each ear of one of the pairs having an aperture therein, each ear of the other of the pairs having an inwardly directed part punched therefrom, the inwardly directed parts entering the apertures for providing a pivotal connection between the base portions of the first and second components, and a coil spring arranged transversely of the base portion between the pairs of ears with the inwardly directed parts projecting in to the opposite ends of the spring for holding the spring in place and the spring normally maintaining the tip portions in facial engagement but upon application of pressure to the base portion of the second component, the tip portion thereof is moved away from the tip portion of the first component against the action of the spring to enable an item to be clipped to be positioned between the tip portions.

References Cited

UNITED STATES PATENTS

| 1,946,561 | 2/1934 | Widerman. | |
| 2,370,434 | 2/1945 | Wolf | 24—252 |
| 2,894,771 | 7/1959 | Putnam | 24—73 |
| 2,961,693 | 11/1960 | Prehm | 24—252 X |
| 3,057,366 | 10/1962 | Fink. | |

DONALD A. GRIFFIN, *Primary Examiner.*